United States Patent [19]

Watanabe

[11] Patent Number: 4,909,878
[45] Date of Patent: Mar. 20, 1990

[54] TIRE REINFORCING MEMBER WINDING APPARATUS

[75] Inventor: Tadashi Watanabe, Tokyo, Japan

[73] Assignee: Bridgestone Corporation, Tokyo, Japan

[21] Appl. No.: 137,915

[22] Filed: Dec. 28, 1987

[30] Foreign Application Priority Data

Apr. 21, 1987 [JP] Japan ................................. 62-98388

[51] Int. Cl.$^4$ ............................................. B32B 31/00
[52] U.S. Cl. .................................. 156/162; 156/405.1; 156/446; 156/494
[58] Field of Search ...................... 156/162, 405.1, 446, 156/494

[56] References Cited

U.S. PATENT DOCUMENTS

| | | | |
|---|---|---|---|
| 4,121,781 | 10/1978 | Angst | 242/45 |
| 4,240,863 | 12/1980 | Vinton | 156/361 |
| 4,295,916 | 10/1981 | Stevens | 156/397 |
| 4,605,457 | 8/1986 | Guy | 156/494 |

FOREIGN PATENT DOCUMENTS

| | | |
|---|---|---|
| 0201653 | 11/1986 | European Pat. Off. |
| 1267929 | 5/1968 | Fed. Rep. of Germany |
| 2723698 | 12/1977 | Fed. Rep. of Germany |
| 1581158 | 9/1969 | France |
| 62-48535 | 3/1987 | Japan |
| 62-203803 | 9/1987 | Japan |

Primary Examiner—Jay H. Woo
Assistant Examiner—Timothy W. Heitbrink
Attorney, Agent, or Firm—Sughrue, Mion, Zinn, Macpeak & Seas

[57] ABSTRACT

A tire reinforcing member winding apparatus having a rotary building drum; winding guides provided upstream to the drum so as to be moved along the axis of the drum while guiding belt-like tire reinforcing members supplied to the drum, to spirally wind the tire reinforcing members on the drum; tensile force application means for applying tensile forces to the tire reinforcing members; detection means for detecting the positions of the tire reinforcing members in the axial direction of the drum; and a control means by which the tensile forces applied to the tire reinforcing members by the tensile force application means are changed depending on the results of the detection by the detection means, so that the tensile forces of the tire reinforcing members wound on the drum are made higher far from the axially central portion of the drum than near the axially central portion.

14 Claims, 2 Drawing Sheets

TIRE REINFORCING MEMBER WINDING APPARATUS

BACKGROUND OF THE INVENTION

The present invention relates to a pneumatic tire reinforcing member and which includes a device for spirally winding belt cap or layer tire reinforcing members on a building drum.

In the Japanese Patent Application No. 46746/86 filed on Mar. 3, 1986, the present applicant proposed a high-speed pneumatic tire in which belt cap or layer tire reinforcing members are spirally wound outside a belt layer in the radial direction of the tire. In the pneumatic tire, the tensile forces of the portions of the tire reinforcing members, which are wound on both the axial end portions of a building drum, are made higher than those of the other portions of the tire reinforcing members, which are wound on the axially central portions of the building drum, so that the portions of the pneumatic tire near both the side edges of the tread thereof are strongly wound. As a result, the diameters of the portions of the pneumatic tire near both the side edges of the tread thereof are prevented from abnormally increasing when the tire is very rapidly rotated in practical use so as to cause a high centrifugal force to act to the portions of heavy rubber mass.

However, a device for spirally winding the tire reinforcing members on the building drum while controlling the tensile forces of said the tire reinforcing members, to form the pneumatic tire, has not been proposed.

OBJECT AND SUMMARY OF THE INVENTION

Accordingly, it is an object of the present invention to provide a tire reinforcing member appropriate to spirally wind tire reinforcing members on a building drum while controlling the tensile forces of the tire reinforcing members, to build a pneumatic tire.

The tire reinforcing member comprises the rotary building drum; winding guides provided upstream to the building drum so as to be moved along the axis of the drum while guiding the belt cap tire reinforcing members being supplied to the building drum, to spirally wind the tire reinforcing members on the drum; tensile force application means for applying tensile forces to the tire reinforcing members; detection means for detecting the positions of the tire reinforcing members in the axial direction of the building drum; and a control means by which the tensile forces applied to the tire reinforcing members by the tensile force application means are changed depending on the results of the detection by the detection means, so that the tensile forces of the tire reinforcing members wound on the building drum are made higher far from the axially central portion of the drum than near the axially central portion.

In the tire reinforcing member provided in accordance with the present invention, the building drum is rotated, the winding guides are moved along the axis of the building drum and the tensile forces are applied to the tire reinforcing members by the tensile force application means so that the tire reinforcing members supplied to the building drum while being guided by the winding guides are spirally wound on the building drum, under prescribed tensile forces. At that time, the positions of the tire reinforcing members in the axial direction of the building drum are detected by the detection means so that the results of the detection are sent to the control means. The tensile force application means are regulated by the control means depending on the results of the detection so that the tensile forces of the tire reinforcing members wound on the building drum are made higher far from the axially central portion of the drum than near the axially central portion. As a result, the portions of the pneumatic tire near both the side edges of the tread thereof are strongly wound to surely prevent the diameters of the portions from increasing when the pneumatic tire is very rapidly rotated in practical use. The pneumatic tire can be easily build through the tire reinforcing member winding process.

DETAILED DESCRIPTION OF THE PREFERRED EMBODIMENT

An embodiment of the present invention, which is a tire reinforcing member, is hereafter described with to the drawings attached hereto.

Figure 1:
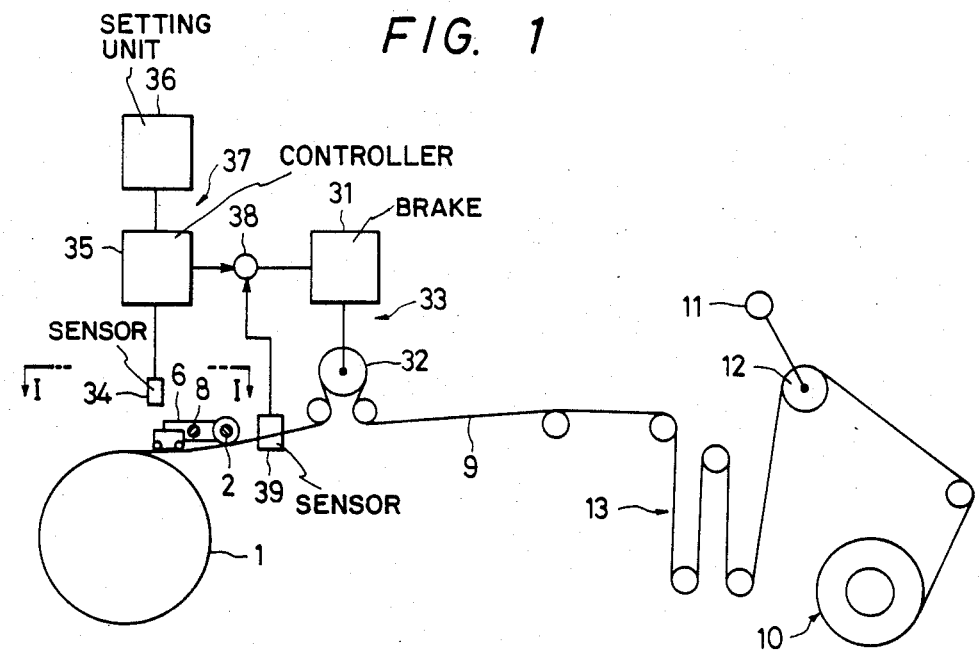
FIG. 1 shows a schematic view of a tire reinforcing member winder which is an embodiment of the present invention.
Figure 2:
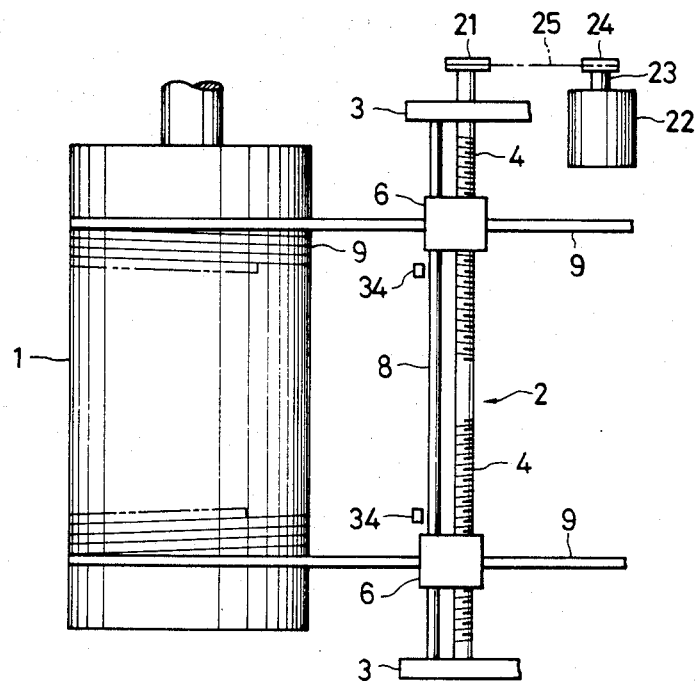
FIG. 2 shows a view seen along arrows I shown in FIG. 1.

FIGS. 1 and 2 show a building drum 1 for build a pneumatic tire. The drum 1 is cylindrically shaped and is rotated by a motor not shown in the drawings. A screw shaft 2 is provided upstream to the building drum 1 in parallel with the rotary shaft of the drum and is rotatably supported at both the ends thereof by a frame 3. The screw shaft 2 has threads 4 divided from each other at the axially central portion of the screw shaft and inverse to each other in the direction of spiral extension. The female threads of winding guides 6 are engaged with the threads 4 of the screw shaft 2. A guide rod 8 parallel with the screw shaft 2 is secured at both the ends thereof to the frame 3 and slidably fitted in the winding guides 6 so that the guides are moved on the guide rod.

A pair of suppling trucks 10, on which tire reinforcing members 9 each having a small width and the member are ribbon like and are wound as rolls, are provided upstream to the screw shaft 2. The tire reinforcing members 9 on the trucks 10 are unwound by guide rollers 12 rotated by motor 11. After the tire reinforcing members 9 unwound by the guide rollers 12 form sagging portions 13, the tire reinforcing members are sent to the winding guides 6 so that the tire reinforcing members are supplied to the building drum 1 while being guided by the winding guides 6.

A timing pulley 21 is secured to the screw shaft 2 at one end thereof. A timing belt 25 is tightly fitted on the timing pulley 21 and another timing pulley 24 secured to the output shaft 23 of a motor 22, so that when the screw shaft 2 is rotated by the motor 22, the winding guides 6 are moved at the same speed as each other in mutually inverse directions along the axis of the building drum 1 while guiding the tire reinforcing members 9, spirally wind the tire reinforcing members on the building drum 1.

The frame 3 is moved toward and away from the building drum 1 by a drive mechanism not shown in the drawings.

Brake rollers 32 connected to electromagnetic brakes 31 are provided between the winding guides 6 and the sagging portions 13 of the tire reinforcing members 9 so that the tire reinforcing members are in contact with the brake rollers without slipping thereon. When braking forces are applied to the brake rollers 32 by the electromagnetic brakes 31, tensile forces corresponding to the braking forces are applied to the tire reinforcing members 9 between the building drum 1 and the brake rollers 32. The electromagnetic brakes 31 and the brake rollers 32 constitute tensile force application means 33 for applying the tensile forces to the tire reinforcing members 9.

Sensors 34 are provided as detection means immediately over the guide rod 8 to detect the positions of the winding guides 6 to sense the positions of the tire reinforcing members 9 in the axial direction of the guide rod. When the tire reinforcing members 9 have reached winding start positions, the sensors detect the winding guides and send out detection signals to a controller 35.

Figure 3:
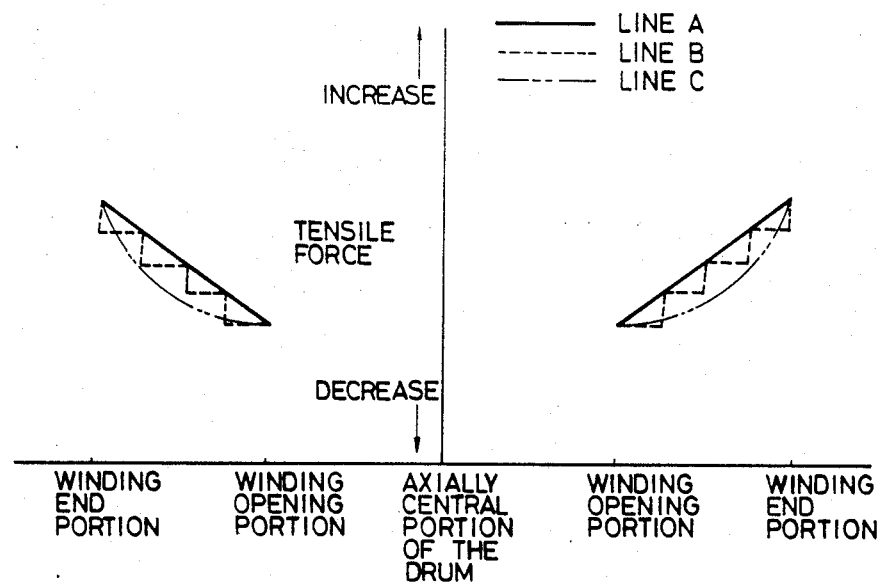
FIG. 3 shows graphs of the tensile forces of tire reinforcing members wound on a building drum.

A program, which is for controlling the electromagnetic brakes 31 so that the tensile forces of the tire reinforcing members 9 wound on the building drum 1 are increase at the axial end portion of the drum than at the axially central portion thereof, is stored in a program setting unit 36 beforehand. For example, the program functions so that the tensile forces are linearly increased from the axially central portion of the building drum 1 toward the axial end portion thereof as shown by a line A in FIG. 3, or is stepwise increased from the axially central portion of the drum toward the axial end portion thereof as shown by a line B in FIG. 3, or is curvedly increased from the axially central portion of the drum toward the axial end portion thereof as shown by a line C in FIG. 3. The program is determined in terms of the kind of the tire to be build, the width of winding of each of the tire reinforcing members 9, the kind of the building drum and so forth.

When the controller 35 has received the detection signals from the sensors 34, the controller uses the program from the program setting unit 36 to send control signals to the electromagnetic brakes 31 in accordance with the program to regulate the braking forces applied by the brakes. The controller 35 and the program setting unit 36 constitute a control means 37 which functions so that the tensile forces applied to the tire reinforcing members 9 by the tensile force application means 33 are controlled depending on the results of the detection by the sensors 34.

Regulators 38 are provided between the controller 35 and the electromagnetic brakes 31. The regulators 38 are supplied with feedback signals from tensile force sensors 39 provided between the winding guides 6 and the brake rollers 32 to detect the tensile forces of the tire reinforcing members 9. The regulators 38 compare the control signals from the controller 35 with the feedback signals from the tensile force sensors 39 to perform the feedback control of the electromagnetic brakes 31.

The operation of the tire reinforcing member will now be described. Suppose that a plurality of layers of the tire reinforcing members such as a carcass ply and a belt ply are already wound on the building drum 1 and the winding guides 6 are waiting in positions nearest each other while holding the front edges of the tire reinforcing members. When the motor 22 is driven so that the screw shaft 2 is rotated, the winding guides 6 are moved at the same speed as each other away from each other along the axis of the building drum 1 while being guided by the guide rod 8. When the tire reinforcing members 9 have reached the winding start positions, the sensors 34 detect the winding guides 6 to stop the motor 22 and send out the detection signals to the controller 35. The frame 3 is then moved toward the building drum 1 by the drive mechanism not shown in the drawings, so that the front edges of the tire reinforcing members 9 held by the winding guides 6 are press-stuck to the tire reinforcing members themselves on the building drum 1. The frame 3 is then moved away from the building drum 1 back to the original position. At that time, since the tire reinforcing members 9 are already released from the winding guides 6, the front edges of the tire reinforcing members are kept press-stuck to the building drum 1.

The controller 35 uses the tire reinforcing member tensile force control program from the program setting unit 36 in response to the detection signals from the sensors 34 to send out the control signals to the electromagnetic brakes 31 through the regulators 38 in accordance with the program. At that time, the motor 22 is driven again so that the winding guides 6 are moved at the same speed as each other away from each other along the axis of the building drum 1 while being guided by the guide rod 8. The building drum 1 and the motors 11 for the unwinding rollers 12 are rotated synchronously with the action of the motor 22 so that after the tire reinforcing members 9 unwound of the winding trucks 10 form the sagging portions 13, the tire reinforcing members are spirally wound on themselves on the building drum 1. When the tire reinforcing members 9 are being spirally wound, the braking forces corresponding to the control signals are applied to the brake rollers 32 by the electromagnetic brakes 31 so that the tensile forces applied to the tire reinforcing members are controlled to be along the line A shown in FIG. 3, for example. The tensile forces are detected by the tensile force sensors 39 to send out the feedback signals from the sensors to the regulators 38 to perform the feedback control. As a result, the tensile forces of the tire reinforcing members 9 wound on the building drum 1 are increased from the axially central portion of the building drum 1 toward the axial end portion thereof in accordance with the program.

When the width of the winding of each of the tire reinforcing members 9 on the building drum 1 has reached a prescribed value, the motor 22, the building drum and the motor 11 are stopped so that the winding of the tire reinforcing member is ceased. The tire reinforcing member 9 is then cut off between the building drum 1 and the winding guide 6 by a cutter not shown in the drawings. The building drum 1 is then rotated to wind the end portion of the cut-off tire reinforcing member 9. A layer, a part of which covers both the ends of a belt ply, is thus wound on the building drum.

Since the tensile forces of the tire reinforcing members 9 wound on the building drum 1 are controlled to be increased from the axially central portion of the building drum toward the axial end portion thereof, the portions of the tire near the side edges of the tread thereof are strongly wound to surely prevent the diameters of the portions of the tire near the side edges of the tread thereof from increasing when the tire is very rapidly rotated in practical use.

Figure 4:
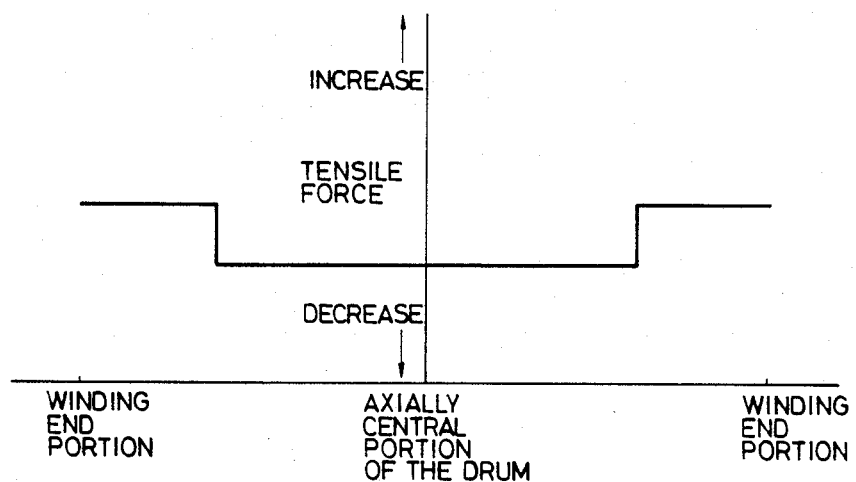
FIG. 4 shows a graph of the each position of tensile forces of tire reinforcing member wound on the building drum.

Although each tire reinforcing member 9 is wound at a relatively small width to make the layer in the above-described embodiment, the present invention is not confined thereto but may be otherwise embodied to wind the tire reinforcing member 9 at a relatively large width to cover at least the whole belt ply. In the other embodiment, the tensile force of the tire reinforcing member 9 may be stepwise changed as shown in FIG. 4, to be lower at the central portion of the winding of the tire reinforcing member than at both the end portions thereof.

Although the braking forces are applied to the brake rollers 32 by the electromagnetic brakes 31 to apply the tensile forces to the tire reinforcing members 9 in the above-described embodiment, the present invention is not confined thereto but may be otherwise embodied so that the revolution speed of each motor 11 for driving the unwinding roller 12 is controlled to apply the tensile force to the tire reinforcing member. In the other embodiment, the sagging portion 13 is not formed, and the tire reinforcing member 9 is directly supplied from the unwinding roller 12 to the building drum 1.

The present invention may be still otherwise embodied so that the speed of unwinding of the tire reinforcing member 9 by the rotation of the guide roller 12 and that of winding of the tire reinforcing member by the rotation of the building drum 1 are equalized to each other, the sagging portion 13 is not formed, and the tire reinforcing member between the guide roller 12 and the building drum 1 is pulled along a rotating roller by a fluid cylinder perpendicularly to the direction of movement of the tire reinforcing member to apply a tensile force to the tire reinforcing member.

The present invention may be still otherwise embodied so that the position of the tire reinforcing member 9 is detected not only at the point of start of winding thereof but also at all the other points by a detection means, or the position of the tire reinforcing member 9 is directly detected.

The present invention may be still otherwise embodied so that the tire reinforcing members 9 are wound on the building drum 1 from both the end portions thereof toward the axially central portion thereof, or the tire reinforcing members are made different from each other in the magnitude of tensile force.

The present invention may be still otherwise embodied so that the tensile forces of the tire reinforcing members 9 being supplied and the pitches of winding of the tire reinforcing members are altered to control the tensile forces of the tire reinforcing members wound on the building drum 1.

According to the present invention, a tire, in which the diameters of the portions of the tire near the side edges of the tread thereof are surely prevented from increasing when the tire is very rapidly rotated in practical used, can be easily formed.

I claim:

1. A tire reinforcing member winding apparatus comprising:
   a rotary building drum rotable about an axial axis;
   winding guide means provided upstream to said drum so as to be moved along the axial axis of said drum while guiding tire reinforcing members being supplied to said drum to spirally wind said tire reinforcing members on said drum;
   tension force application means for applying tensile forces to said tire reinforcing members;
   detection means for detecting the positions of said tire reinforcing members in the axial direction of said drum; and
   control means by which said tensile forces applied to said tire reinforcing members by said tensile force application means are changed in response to a position of said two reinforcing members detailed by said detections means, so that tensile forces of said tire reinforcing members wound on said drum are made higher at positions laterally from an axially central portion,
   wherein said tensile force application means comprises a brake roller and an electromagnetic brake controlling said brake roller.

2. A tire reinforcing member winding apparatus of claim 1, wherein a tensile force is applied to said tire reinforcing members due to a braking force generated by said electromagnetic brake applied to said brake roller.

3. A tire reinforcing member winding apparatus of claim 2, wherein said control means comprises a controller receiving a detection signal from said detection means and a program setting unit storing programs for controlling said electromagnetic brake.

4. A tire reinforcing member winding apparatus of claim 3, further comprising a regulator provided between said controller and said electromagnetic brake and, a tensile sensor provided between said winding guide means and said brake roller to detect said tensile force of said tire reinforcing members, wherein said regulator is supplied with feedback signals from said tensile force sensor.

5. A tire reinforcing member winding apparatus of claim 4, wherein said regulator compares said control signals from said controller with feedback signals from said tensile force sensor to perform a feedback control of said electromagnetic brake.

6. A tire reinforcing member winding apparatus of claim 1, wherein said winding guide means comprising:
   a winding guide having female screws,
   a screw shaft that provided upstream to said drum is parallel with the rotary shaft of said drum,
   a frame rotary supported at both the ends of said screw shaft, and
   a guide rod parallel with said screw shaft secured at both the ends thereof to said frame.

7. A tire reinforcing member winding apparatus of claim 6, wherein said guide rod is slidably fitted in said winding guide so that said winding guide is moved on said guide rod.

8. A tire reinforcing member winding apparatus of claim 7, wherein said screw shaft comprises threads divided from each other at the axially central portion of the screw shaft and inverse to each other in a direction of spiral extension.

9. A tire reinforcing member winding apparatus of claim 8, wherein said female screws of said winding guide means are engaged with said screws of said screw shaft.

10. A tire reinforcing member winding apparatus of claim 1, wherein said winding guide means are moved at the same speed as each other in mutually opposite directions along the axis of said drum while guiding said tire reinforcing members.

11. A tire reinforcing member winding apparatus of claim 1, wherein said control means is operated by a program, said program functioning so that the tensile forces are linearly increased from the axial end portion thereof.

12. A tire reinforcing member winding apparatus of claim 1, in which said control means is operated by a program, said program functioning so that the tensile forces are stepwise increased from the axially central portion of said drum toward the axial end portion thereof.

13. A tire reinforcing member winding apparatus of claim 1, in which said control means is operated by a program, said program functioning so that the tensile forces are curvedly increased from the axially central portion of said drum toward the axial end portion thereof.

14. A tire reinforcing member winding apparatus of claim 1, in which said control means is operated by a program, said program functioning so that the tensile forces are stepwise changed to be lower at the central portion of the winding of the tire reinforcing member than at both the end portions thereof.

* * * * *